Aug. 20, 1940.    W. H. FISCHER    2,212,065
ELECTRICAL APPLIANCE BASE
Filed Oct. 19, 1936    2 Sheets-Sheet 1
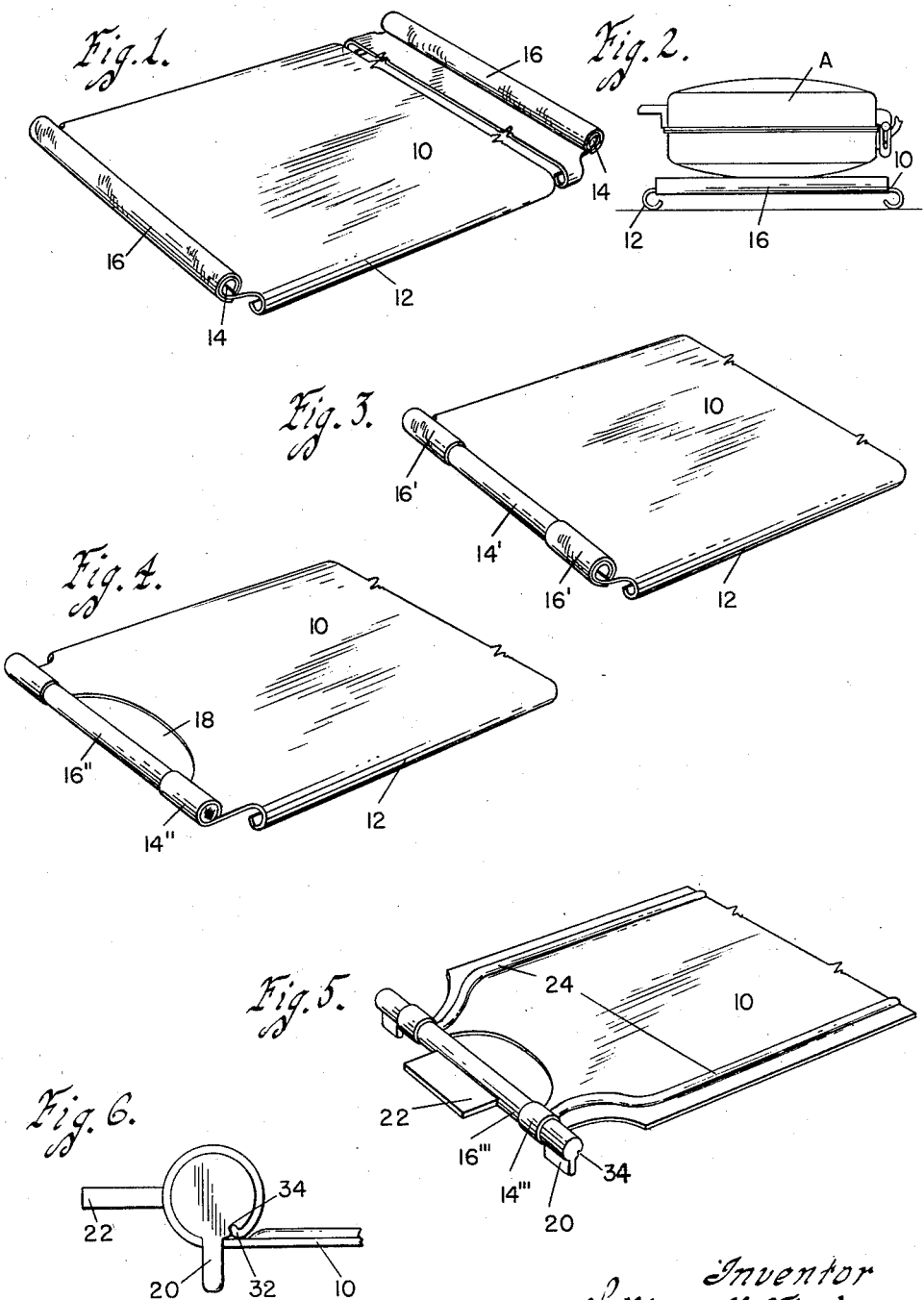

Aug. 20, 1940.  W. H. FISCHER  2,212,065
ELECTRICAL APPLIANCE BASE
Filed Oct. 19, 1936  2 Sheets-Sheet 2
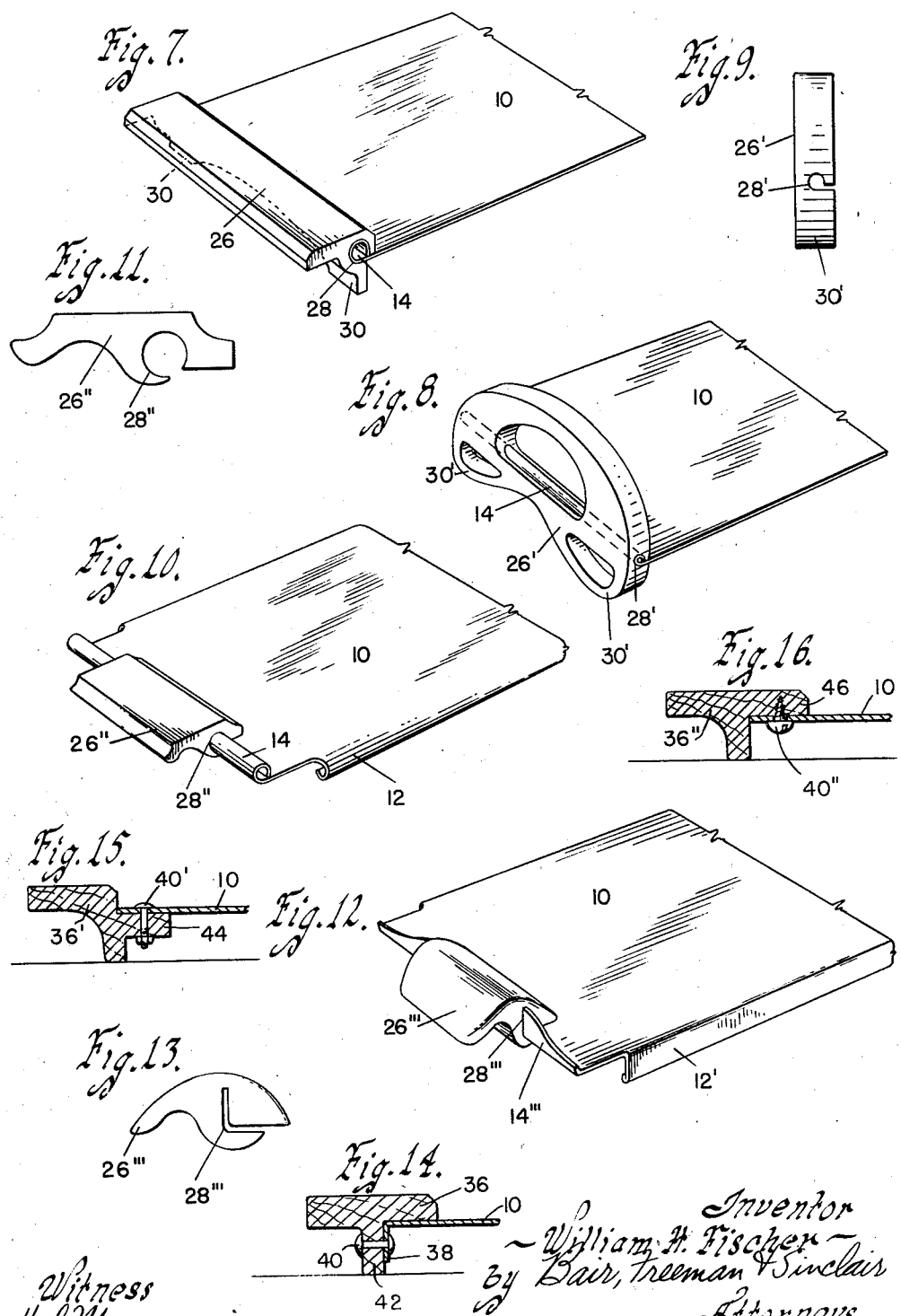
Witness
H. S. Munzenmaier
Inventor
William H. Fischer
by Bair, Freeman & Sinclair
Attorneys Patented Aug. 20, 1940

2,212,065

UNITED STATES PATENT OFFICE 2,212,065

ELECTRICAL APPLIANCE BASE

William H. Fischer, St. Louis, Mo., assignor to Knapp-Monarch Company, St. Louis, Mo., a corporation of Missouri Application October 19, 1936, Serial No. 106,495

5 Claims. (Cl. 65—53)

An object of my invention is to provide a plate-like supporting base for electrical appliances, such as sandwich toasters and the like, the base being comparatively simple and inexpensive from a manufacturing standpoint.

A further object is to provide a base for an electrical appliance, the base being formed of a sheet of metal and having flanges along two opposite ends thereof with which handle members coact by sliding the handle members either into or on the flanged ends of the supporting plate, the handle members thereupon projecting from the ends of the base and serving the purpose of permitting the base to be carried by hand.

A further object is to provide an electric appliance base for an appliance especially of the low mounted type, the base being particularly adapted for mounting the appliance in a low position with respect to a table top or other supporting surface without an objectionable amount of heat from the appliance affecting the table top.

Still a further object is to provide a supporting plate and handles therefor with the plate or the handles being provided with means serving as feet for spacing the supporting plate above a table top or the like.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of an electrical appliance base embodying my invention.

Figure 2 is an end elevation thereof showing an electrical appliance mounted thereon.

Figure 3 is a perspective view of one end of a modified base.

Figures 4 and 5 are perspective views of other modified forms.

Figure 6 is an enlarged end elevation of the left hand end of Figure 5.

Figures 7 and 8 are perspective views of other modified constructions.

Figure 9 is an end elevation of the left hand end of Figure 8.

Figure 10 is a perspective view of still another modified form.

Figure 11 is an end elevation of the handle used in the construction shown in Figure 10.

Figure 12 is a perspective view of still another modified form of the construction.

Figure 13 is an end elevation of the handle used in connection therewith.

Figure 14 is a sectional view through the edge of a plate and handle member showing a further modified arrangement.

Figures 15 and 16 are similar views showing different methods of connecting the handle member to the supporting plate.

On the accompanying drawings, throughout the various figures thereof, I have used the reference numeral 10 to indicate a supporting base in the form of a plate of sheet metal to which an electrical appliance A (see Figure 2) can be suitably secured. The base plate 10 is reinforced along the side edges thereof by flanges 12. These flanges serve the purpose of supporting feet as will be evident from an inspection of Figure 2. In Figures 1, 3, 4 and 10 the flanges 12 are rolled, while in Figure 12 the flange is of a different shape and indicated as 12'.

Along the two opposite ends of the base plate 10, shown in Figure 1, rolled flanges 14 are provided and these are enclosed in split tubular handle members 16. The members 16 may be of insulating material or of metal, preferably having a distinguishing color from the color used for the base plate 10.

For instance, the base plate may be enameled black and the handles 16 may be chromium plated, or formed of insulating material of a color other than black.

During assembly it is merely necessary to force the handle members 16 longitudinally on to the flanges 14, the handle members thereafter being retained in position due to the frictional engagement between them and the flanges 14.

If desired, the handle members 16 can extend only part way along the flanges 14, as shown in Figure 3, in which they are indicated as relatively short tubular elements 16'.

The handle and flanges may be reversed as shown in Figure 4, the handle 16" being a rod of wood or insulating material received in the flanges 14" which are rolled around the ends of the handle. The base plate 10 may be cut away as indicated at 18 so that the handle 16" can be readily grasped.

If desired, the flanges 12 may be omitted and a handle 16''', such as shown in Figure 5, used, this handle being provided with downwardly extending flanges 20 and outwardly extending flanges 22. The flanges 20 and 22 serve as supporting feet and handles respectively.

With the flanges 12 omitted, it would possibly be necessary to reinforce the sheet metal base 10 and this can be accomplished by forming ribs 24 along the side edges thereof.

In Figure 7, I illustrate an example wherein a handle 26 is provided in the form of a molding having a bore 28 to receive the rolled flange 14. Feet 30 are provided for the handle 26 so that it serves the combined purpose of a handle and support for the plate 10.

In Figure 8 I show another shape of handle 26' to illustrate the different designs which can be used, yet retain the same general principle of a handle having a bore to receive a flange or deformed end of the supporting plate. The bore of the handle 26' is indicated at 28' while the feet portions thereof are indicated at 30'.

Figures 10 and 11 illustrate how a molding 26'' may be utilized extending only partly along the end of the plate 10 while Figures 12 and 13 illustrate a handle 26''' associated with a flange 14'''' of a different shape than the rolled flange 14. The bore 28''' is likewise formed of a different shape so that it will fit the flange on the end of the base. Each of the handles illustrated coacts with a deformed end of the base plate and is thereby held assembled relative to the base plate.

In all but Figures 5, 6, 14, 15 and 16 the handle can be slid either on to or into the deformed end of the base. In Figures 5 and 6 the flanges 14'''' are wrapped around or encircle the handle 16''' and may terminate in bent portions 32 adapted to be received in grooves 34 of the handle members 16''' to retain the handle member against undesired rotation.

In Figure 14 a handle member 36 is provided which is not grooved or provided with a bore. The plate 10 is illustrated as having a flange 38 on its end riveted by means of a rivet 40 to a vertical flange 42 of the handle 36. Either rivets or bolts can be used, Figure 15 illustrating a handle 36' having a horizontal flange 44 to which the plate 10 is bolted by a bolt 40'. The supporting plate in this instance is bolted to the top of the flange. In Figure 16 a handle 36'' is illustrated having a horizontal flange 46 to the bottom of which the plate 10 is secured as by screws 40''.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In an electrical appliance base, a plate-like supporting member having the end edges thereof deformed therealong and handle members having bores receiving and encircling the major portion of the cross sectional area of said deformed edges when said handle members are assembled on said supporting member, said handle members remaining in fixed position relative to said supporting member after assembly and having portions extending to an elevation below the bottommost portion of said supporting member to serve as supporting feet for said electric appliance base and space said plate-like supporting member thereof above a supporting surface.

2. In a support for an electrical appliance, a supporting member of rectangular shape, two opposite edges thereof being flanged downwardly to provide supporting means for supporting said plate and to reinforce it in one direction and the other two edges thereof being flanged to reinforce it in the other direction and handle members having bores to fit said last flanges and thereby retain said handle members assembled relative to said supporting member.

3. In an electrical appliance base, a plate-like supporting member having two opposite edges thereof deformed to a shape laterally therealong having portions out of the general plane of the supporting member and handle members coacting with said deformed ends and thereby mounted on said supporting member, said handle members having longitudinal bores which are shaped in cross section similar to said deformed ends and which receive, fit and entirely encircle said deformed ends throughout the length of the handle members.

4. In an electrical appliance base, a horizontal supporting plate, a rolled flange formed along one edge thereof and a handle member having an elongated cylindrical bore to slidably receive and snugly fit substantially the entire periphery of said flange during assembly of said handle member on said supporting plate, said handle member extending a substantial distance lengthwise of said rolled flange and remaining thereon after assembly by frictional engagement therewith.

5. In an electrical appliance base, a supporting plate having two opposite edges thereof deformed to substantially elongated cylindrical shapes and handle members enclosing said deformed edges to a degree sufficient to eliminate the necessity of fastening means and thereby mounted on said supporting plate, said handle members having their ends terminating substantially coincident with the ends of said edges.

WILLIAM H. FISCHER.